United States Patent [19]
Endo et al.

[11] Patent Number: 5,164,967
[45] Date of Patent: Nov. 17, 1992

[54] PEDOMETER FOR WALKING, JOGGING, ETC.

[75] Inventors: Mikiya Endo, Fijieda; Mitsuhiro Ikeda, Tokyo, both of Japan

[73] Assignee: Marutakairyoki Kabushikigaisha, Shizuoka, Japan

[21] Appl. No.: 577,753

[22] Filed: Sep. 4, 1990

[30] Foreign Application Priority Data

Sep. 6, 1989 [JP] Japan .................. 1-231048

[51] Int. Cl.$^5$ .................. G01C 22/00; G08B 7/00
[52] U.S. Cl. .................. 377/24.2; 377/5; 340/323 R
[58] Field of Search ............ 272/70, DIG. 5, DIG. 6, 272/DIG. 9; 377/5, 24, 24.1, 24.2; 307/234, 308; 364/561; 340/561, 384 R, 384 E, 323 R; 73/279; 128/779

[56] References Cited

U.S. PATENT DOCUMENTS

| | | | |
|---|---|---|---|
| 3,797,010 | 3/1974 | Adler et al. | 377/24.2 |
| 4,099,713 | 7/1978 | Spector | 340/323 R |
| 4,220,996 | 9/1980 | Searcy | 377/24.2 |
| 4,283,712 | 8/1981 | Goody | 377/24.2 |
| 4,285,041 | 8/1981 | Smith | 377/24.2 |
| 4,309,599 | 1/1982 | Myers | 377/24.2 |
| 4,371,945 | 2/1983 | Karr et al. | 377/24.2 |
| 4,409,992 | 10/1983 | Sidorenko et al. | 276/DIG. 6 |
| 4,443,008 | 4/1984 | Shimano | 272/DIG. 6 |
| 4,510,485 | 4/1985 | Tahara | 340/323 R |
| 4,750,372 | 6/1988 | Hoelzl | 128/779 |
| 5,065,414 | 11/1991 | Endou et al. | 377/24.2 |

FOREIGN PATENT DOCUMENTS 0262784 10/1988 Japan .................. 377/24.2

*Primary Examiner*—Stanley D. Miller
*Assistant Examiner*—Tai V. Duong
*Attorney, Agent, or Firm*—Arthur T. Fattibene; Paul A. Fattibene

[57] ABSTRACT

A pedometer for exercise such as walking and jogging, comprising the fact that an appropriate intensity of exercise is set by setting reference signals, which the user of the pedometer is permitted to hear with a sound producer or an earphone, thereby making it possible to render the user conscious of the exercise at the appropriate intensity and to count or measure and then display the number of steps of the exercise, the period of time thereof, and the continuation period of time thereof as associated with the set reference signals.

10 Claims, 2 Drawing Sheets

_5,164,967_

PEDOMETER FOR WALKING, JOGGING, ETC.

BACKGROUND OF THE INVENTION

The present invention relates to a pedometer for walking, jogging etc. in which the sounds of a preset pace are produced. More particularly, it relates to such a pedometer in which the number of steps in walking (jogging or the like), the period of time of the walking (jogging or the like) and the continuation period of time as associated with the set pace are displayed for the purpose of letting a user recognize the state of the walking (jogging or the like).

Jogging, walking etc. are popularly practised in order to maintain and promote the health. Heretofore, the quantities of these exercises have been approximately estimated in terms of the total numbers of steps per day, and pedometers have been used for the measurements thereof. In recent years, researches on how to take exercise for the health have advanced, and the aims of the intensity of exercise and the continuation period of time of the exercise have been revealed as the quantity of the exercise effective for the maintenance and promotion of the health. In this regard, a pedometer which can display the speed of walking as the intensity of exercise and can also measure the period of time of the walking is commercially available.

Since the conventional pedometer counts the steps irrespective of slow walking and fast walking, whether or not the quantity of the exercise is effective for the maintenance and promotion of the health cannot be judged from only the number of steps indicated by the pedometer. On the other hand, the prior-art pedometer which displays the speed of walking computes and displays the walking speed on the basis of the number of steps within a predetermined period of time, so that a user must acknowledge the display during the exercise. Moreover, regarding the measurement of the period of time, the prior-art pedometer has only a timer function which is manually effectuated before and after the exercise by the user and a timepiece function which presents time, so that the intensity of the exercise and the continuation period thereof must be stored or recorded every exercise. In this manner, the prior-art pedometer is very inconvenient.

Accordingly, the intensity of exercise of walking and the period of time of the walking cannot be readily known at the end of one day.

SUMMARY OF THE INVENTION

In order to solve the above problems, a pedometer for walking, jogging etc. according to the present invention is so constructed that the pitch of the walking, jogging or the like is set as the intensity of exercise by a reference signal setting unit, that the interval of the set reference signals and the interval of detection signals generated by the walking, jogging or the like are compared by a comparator, that an output signal is produced from the comparator when the comparison reference is satisfied, and that the number of steps, the period of time of the walking, jogging or the like, and the continuation period of time as associated with the preset reference signals are presented to the user of the pedometer on the basis of such output signals of the comparator.

The number of steps associated with the set intensity of the walking, jogging or the like is that number of the output signals of the comparator which is counted by a number-of-conforming-steps counter. The period of time of the walking, jogging or the like is a period of time which is calculated from the interval of reference signals set by a period-of-conforming-exercise counter and the output of the number-of-conforming-steps counter. Continuity is estimated by an estimation unit in such a way that an output signal is produced from the estimation unit when an estimation reference is satisfied, and a continuation period measuring unit measures the continuation period of time on the basis of such output signals of the estimation unit.

The outputs of the number-of-conforming-steps counter, the period-of-conforming-exercise counter and the continuation period measuring unit are displayed on a display unit as the number of steps of the walking, jogging or the like, the period of time thereof and the continuation period of time thereof which are associated with the preset reference signals.

As thus far described, the appropriate intensity of exercise is set with the reference signals, and the number of steps of the walking, jogging or the like, the period of time thereof and the continuation period of time thereof as associated with the reference signals are measured and displayed, whereby the user can know whether or not the walking, jogging or the like on one day is a state effective for the maintenance and promotion of the health.

BRIEF DESCRIPTION OF THE DRAWINGS

FIG. 1 is a block diagram showing an embodiment of the present invention, while

Throughout the drawings, the same numerals indicate identical portions.

PREFERRED EMBODIMENT OF THE INVENTION

Figure 1:
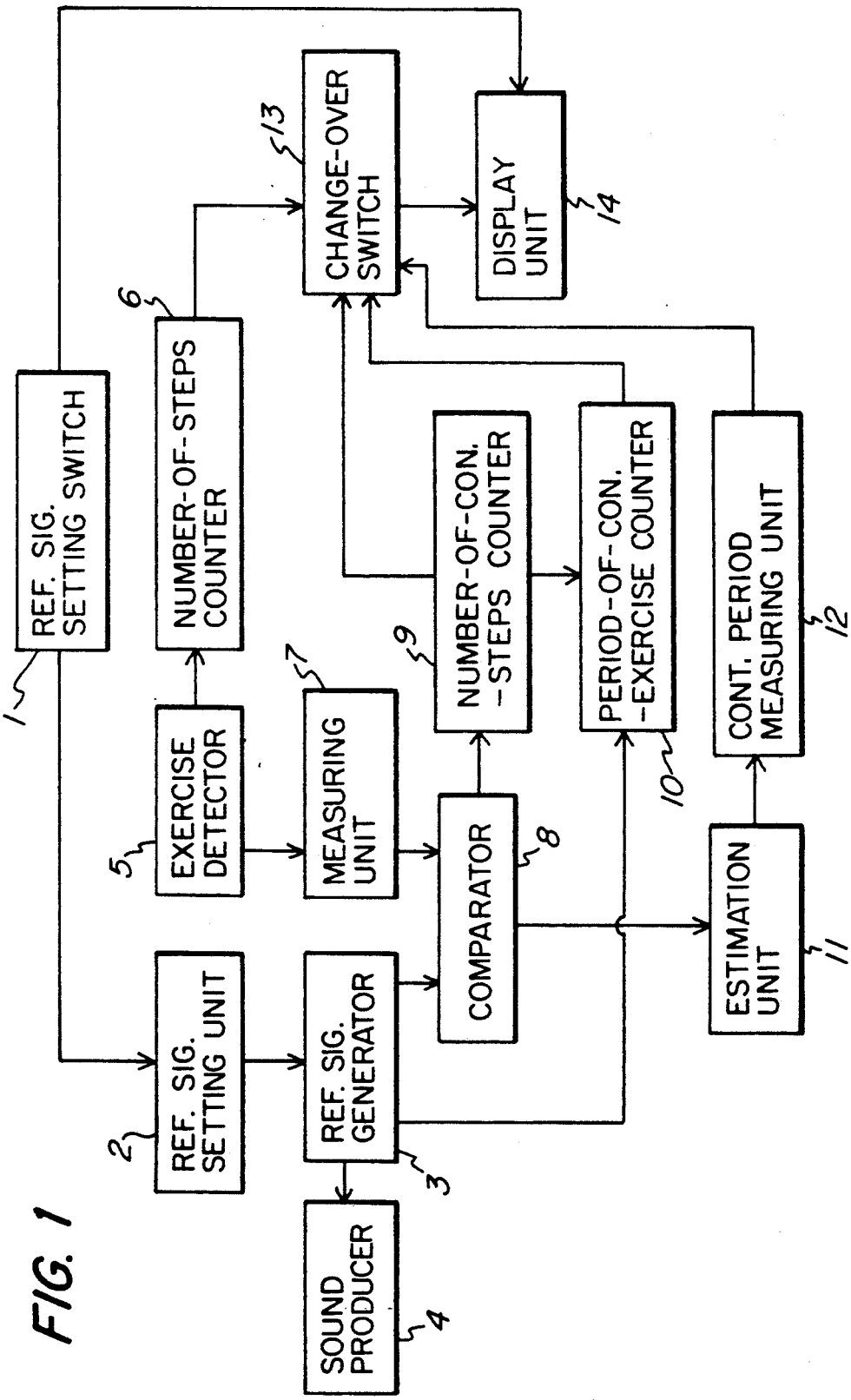

FIG. 1 is a block diagram showing a pedometer for walking, jogging etc. in an embodiment of the present invention.

Referring to the figure, numeral 1 designates a reference signal setting switch with which the user of the pedometer actuates a reference signal setting unit 2 in order to set the number of reference signals at will and displays the number of reference signals to-be-generated on a display unit 14. A reference signal generator 3 generates the set reference signals, while a sound producer 4 produces the sounds of the pitch of the walking, jogging or the like in accordance with the output signals from the reference signal generator 3. The walking, jogging or the like is detected by an exercise detector 5. A number-of-steps counter 6 counts the number of steps in the exercise, namely, the walking, jogging or the like detected by the exercise detector 5, while a measuring unit 7 measures the interval of output signals from the exercise detector 5 and delivers the measured value as an output. Numeral 8 indicates a comparator which compares the output of the measuring unit 7 with the interval of the reference signals of the reference signal generator 3, and which produces an output signal when the comparison reference is satisfied. Considered as the comparison reference is the condition that the measured value of the measuring unit 7 is substantially equal to the interval of the set reference signals, or the condition that the measured value is smaller than the interval of the set reference signals. In addition, numeral 9 indicates a number-of-conforming-steps counter for counting the number of conforming steps which conform to the comparison reference, and numeral 10 a period-of-conforming-exercise counter for calculating the period of time of the walking, jogging or the like from the number of conforming steps and the interval of the set reference signals. These constituents 9 and 10 are also effective for expressing the factors of the state of the exercise of the walking, jogging or the like. Further, an estimation unit 11 estimates the continuity of the output signals of the comparator 8 and delivers output signals when an estimation reference has been satisfied and when it has failed to be satisfied. A continuation period measuring unit 12 measures the continuation period of time in accordance with the output signals of the estimation unit 11. Shown at numeral 13 is a change-over switch which serves to display on the display unit 14 a selected one of the number of steps cumulated in the number-of-steps counter 6, the number of conforming steps counted by the number-of-conforming-steps counter 9, the period of time of the walking, jogging or the like calculated by the period-of-conforming-exercise counter 10, and the continuation period of time cumulated in the continuation period measuring unit 12.

Figure 2:
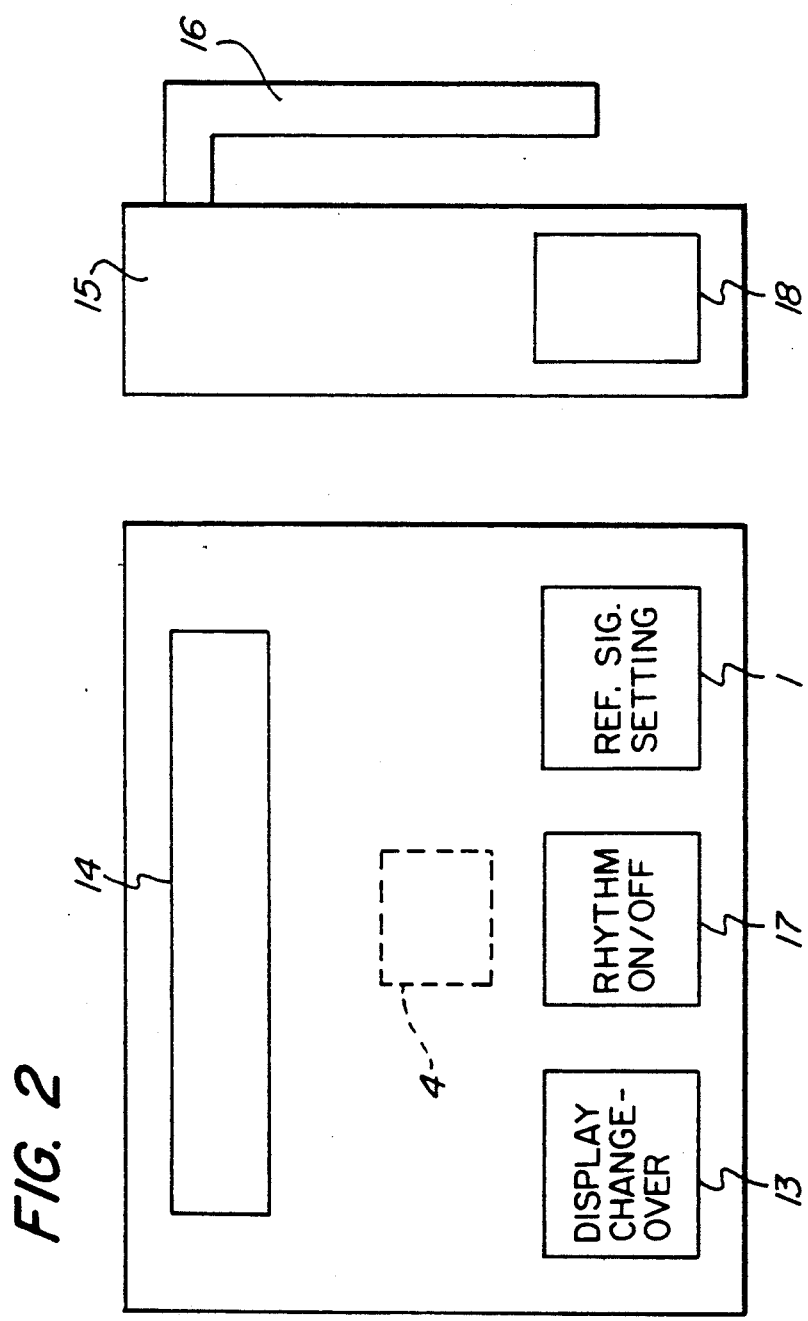
FIG. 2 is a diagram showing an example of application of the present invention.

FIG. 2 is a diagram showing one example of application of the present invention.

Referring to the figure, numeral 15 designates a pedometer proper, and numeral 16 designates a clip portion which is fitted on a belt or the like, thereby to set the pedometer on the body of the user. The display change-over switch 13 is used for changing-over the displays of the number of steps cumulated in the number-of-steps counter 6, the number of conforming steps cumulated in the number-of-conforming-steps counter 9, the period of time of the walking, jogging or the like calculated by the period-of-conforming-exercise counter 10, and the continuation period of time cumulated in the continuation period measuring unit 12. Numeral 17 indicates a rhythm switch with which the sound of the sound producer 4 is turned ON/OFF. Meanwhile, when the reference signal setting switch 1 is depressed once, the number of reference signals having been set till then is displayed on the display unit 14. When the switch 1 is depressed in succession, the number of reference signals is increased a predetermined integral value every depression, within a range from 20 to 200 by way of example. Besides, when the switch 1 is depressed after the display of the number 200, the set number becomes the number 20. Further depression of the switch 1 changes the set number similarly to the above. Shown at numeral 18 is an earphone terminal which is used in such a case where the sound from the sound producer 4 is difficult to be heard due to, e.g., noise.

The pedometer according to the present invention is constructed as stated above, and the operation thereof will now be described with reference to FIGS. 1 and 2.

In order to set any desired appropriate pace for exercise, namely, walking, jogging or the like, the user actuates the reference signal setting unit 2 to set the pace of the exercise by means of the reference signal setting switch 1.

At first, the reference signal setting switch 1 is depressed once. Then, a value having been set by the last depression is displayed on the display unit 14. When the switch 1 is further kept depressed, the number of reference signals is increased to the maximum set number of the pitch every integral value. When the switch 1 is depressed once more, the minimum set number of the pitch is displayed. Further depression of the switch 1 increases the set number every integral value as described above. In this way, the desired appropriate pace for the exercise can be set.

When the reference signals have been set, the interval of the set reference signals is delivered to the comparator 8 by the reference signal generator 3.

The exercise, namely, the walking, jogging or the like is detected by the exercise detector 5, the output signal of which is delivered to the number-of-steps counter 6 and the measuring unit 7. The number-of-steps counter 6 counts the number of steps as the ordinary number of steps in the exercise, while the measuring unit 7 measures an exercise interval (the actual period of time taken per step) and delivers the measured value to the comparator 8. The measuring unit 7 performs the function of measuring the interval between output signals received from the exercise detector 5. The measuring unit therefore of the nature of a frequency counter.

The comparator 8 delivers its output signal when the interval of the set reference signals and the output of the measuring unit 7 satisfy the comparison reference, for example, the reference that the output of the measuring unit 7 is substantially equal to the interval of the signals generated by the generator 3. Subsequently, such outputs of the comparator 8 are counted by the number-of-conforming-steps counter 9 and are used for estimating the continuity in the estimation unit 11.

Further, the period of time of the walking, jogging or the like is calculated from the output of the number-of-conforming-steps counter 9 and the interval of the set reference signals by the period-of-conforming-exercise counter 10.

Considered as the estimation reference for the continuity is, for example, the condition that the output signal is delivered from the comparator 8 within a preset period of time. That is, when the condition is met, the output is regarded as being continuous, and when not, the output is judged to be discontinuous. The estimation unit 11 performs the function of estimating the continuity of the output signals of the comparator 8. Should a signal not be received from the comparator 8 within a predetermined period of time, the stream of signals will not be deemed continuous. In essence, this is a timing circuit that times the interval between signals and makes an evaluation of the continuity of the signals based on the time period between their arrival or interval.

While the output of the comparator 8 is continuing in conformity with the aforementioned reference, the continuation period of time is measured by the continuation period measuring unit 12. The continuation period measuring unit 12 performs the function of measuring the continuous period of time elapsed during the detection of a continuity of signals being received. This is merely a circuit that starts timing upon the establishment of a continuity of signals and stops timing when the continuity of signals is determined not to be received.

When the user depresses the rhythm switch 17, the pitch sound at the set pitch is given forth by the sound producer 4, so that he/she can take the conscious exercise. Further, if necessary, he/she can know the exercise state of one day in such a way that the number of steps, the number of conforming steps, the period of time of the exercise and the continuation period of time are displayed on the display unit 14 through the display change-over switch 13 at, for example, the fixed time of every day.

Owing to the construction and operation described above, the present invention consists in that an appropriate intensity of exercise is set by setting reference signals, which the user of a pedometer is permitted to hear with a sound producer or an earphone, thereby making it possible to render the user conscious of the exercise, namely, the walking, jogging or the like at the appropriate intensity and to count or measure and then display the number of steps of the exercise, the period of time thereof, and the continuation period of time thereof as associated with the set reference signals. Therefore, the pedometer of the present invention can inform the user of an exercise state easily as compared with the conventional pedometer which presents only the number of steps and with the prior-art pedometer in which the quantity of exercise must be stored or recorded every exercise.

We claim:

1. A pedometer for walking, jogging, comprising a reference signal setting unit which serves to set a number of reference signals, a reference signal generator which generates the reference signals in the number set by said reference signal setting unit, a sound producer which produces a sound in response to the number of reference signals, an exercise detector which detects the walking, jogging and delivers detection signals as an output, a number-of-steps counter which counts the detection signals of said exercise detector, a measuring unit which measures an interval of the detection signals and delivers a measured value as an output, a comparator which compares an interval of the reference signals and the measured value in accordance with a preset comparison reference in said comparator and which delivers an output signal when the comparison reference is satisfied, an estimation unit which estimates continuity of the output signal of said comparator in accordance with a preset estimation reference in said estimation unit, a continuation period measuring unit which measures a continuation period of time on the basis of output signals of said estimation unit, and a display unit which displays outputs from said number-of-steps counter and said continuation period measuring unit.

2. A pedometer for walking, jogging as defined in claim 1, wherein the comparison reference is a condition that the interval of the set reference signals and the measured value of said measuring unit are substantially equal.

3. A pedometer for walking, jogging as defined in claim 1, wherein the comparison reference is a condition that the measured value of said measuring unit is smaller than the interval of the set reference signals.

4. A pedometer for walking, jogging as defined in claim 1, further comprising a number-of-conforming-steps counter which counts output signals of said comparator, and the count value of said number-of-conforming-steps counter displayed on said display unit.

5. A pedometer for walking, jogging as defined in claim 1, further comprising a number-of-conforming-steps counter which counts the output signals of said comparator, and a period-of-conforming-exercise counter which computes a period of time of the exercise from the interval of the reference signals set by said reference signal setting unit and the output of said number-of-conforming-steps counter, and which cumulates the computed periods of time, the count value of said number-of-conforming-steps and the cumulative value of said period-of-conforming exercise counter being displayed on said display unit.

6. A pedometer comprising:
reference signal setting unit means for setting a plurality of reference signals;
reference signal generator means, coupled to said reference signal setting unit means, for generating the plurality of reference signals;
sound producer means, coupled to said reference signal generator means, for producing a signal in response to the plurality of reference signals;
exercise detector means, for detecting the motion of walking, jogging and delivering a detection signal;
number of steps counter means, coupled to said exercise detector means, for counting each said detection signal;
measuring unit means, coupled to said exercise detector means, for measuring an interval between each said detection signal;
comparator means, coupled to said measuring unit means, for comparing the interval between each said detection signal with a predetermined interval;
estimation unit means, coupled to said comparator, for estimating the continuity of detection signals in accordance with a predetermined estimation reference in said estimation unit means;
continuous period measuring unit means, coupled to said estimation unit means, for measuring a continuous period of time based upon the continuity of said detection signals; and
display means for displaying outputs from said number of steps counter means, and said continuous period measuring unit means,
whereby a user can easily determined the continuous period of time of exercise that has been performed at a predetermined level of effort.

7. A pedometer as in claim 6 wherein:
the predetermined interval, the interval between each said reference signals, and the interval between each said detection signal are equal.

8. A pedometer as in claim 6 wherein:
the predetermined interval is less than the interval between each said plurality of reference signals.

9. A pedometer as in claim 6 further comprising:
a number of conforming steps counter means, coupled to said comparator means, for counting each said detection signal having a predetermined interval.

10. A pedometer as in claim 9 further comprising:
period of conforming exercise means, coupled to said reference signal generator and said number of conforming steps counter, for accumulator individual continuous periods of time.

* * * * *